(12) United States Patent
Zettell (10) Patent No.: US 9,556,615 B1
(45) Date of Patent: Jan. 31, 2017

(54) ENCAPSULATED PANEL SYSTEMS (71) Applicant: The Dragon Group, LLC, Hayden, ID (US)

(72) Inventor: Adrian William Zettell, Newburg, ND (US)

(73) Assignee: The Dragon Group, LLC, Hayden, ID (US)

( * ) Notice: Subject to any disclaimer, the term of this patent is extended or adjusted under 35 U.S.C. 154(b) by 0 days.

(21) Appl. No.: 14/882,060

(22) Filed: Oct. 13, 2015

(51) Int. Cl.
*E04B 2/00* (2006.01)
*E04C 2/20* (2006.01)
*F16L 59/02* (2006.01)
*E04B 1/76* (2006.01)
*E04H 7/06* (2006.01)
*E04H 7/30* (2006.01)
*B65D 90/08* (2006.01)
*F25D 23/06* (2006.01)
*B65D 21/02* (2006.01)
*E04H 4/14* (2006.01)
*E04H 4/00* (2006.01)
(Continued)

(52) U.S. Cl.
CPC .............. *E04C 2/205* (2013.01); *E04B 1/76* (2013.01); *E04C 2/44* (2013.01); *F16L 59/025* (2013.01); *B65D 21/0204* (2013.01); *B65D 90/08* (2013.01); *E04B 1/14* (2013.01); *E04B 1/6129* (2013.01); *E04C 2/292* (2013.01); *E04H 4/005* (2013.01); *E04H 4/0018* (2013.01); *E04H 4/0031* (2013.01); *E04H 4/0043* (2013.01); *E04H 7/06* (2013.01); *E04H 7/30* (2013.01); *E04H 2004/146* (2013.01); *F25D 23/063* (2013.01); *Y10T 29/49826* (2015.01)

(58) Field of Classification Search
CPC ....... E04C 2/292; B65D 90/08; B65D 90/205; B65D 21/0204; E04B 1/6129; E04B 1/14; E04H 4/0043; E04H 4/005; E04H 4/0018; E04H 4/0031; E04H 7/06; E04H 7/30; E04H 2004/146; F25D 23/063; Y10T 29/49826
USPC ................. 52/579, 581, 588.1, 582.1, 584.1, 800.12,52/245–249, 169.7, 309.4, 782.1; 4/506; 220/4.12, 4.13
See application file for complete search history.

(56) References Cited

U.S. PATENT DOCUMENTS 1,031,050 A * 7/1912 Conzelman ............ B65D 88/08
 52/247
1,125,070 A * 1/1915 Daviee ................... B65D 90/08
 220/4.17

(Continued)

OTHER PUBLICATIONS

"ThermaSeam—Tank Insulation System", Thermon, retrieved on Jun. 5, 2015 at <<http://www.thermon.com/us/products.aspx?prodid=13>>, 1 page.

*Primary Examiner* — Chi Q Nguyen
(74) *Attorney, Agent, or Firm* — Lee & Hayes, PLLC (57) ABSTRACT

This application describes insulated panel systems with first and second encapsulated foam core panels having foam cores, coated with or otherwise encapsulated in a shell material. Front and back overlap members may be fixed to the first encapsulated foam core panel or the second encapsulated foam core panel to allow the insulated panel system to removeably cover a container around a perimeter of the container (i.e., in a lateral direction relative to the container). A drip edge and overlap member may be fixed to the first encapsulated foam core panel to allow the insulated panel (Continued)

system to removeably cover a container vertically along a height of the container (i.e., in a vertical direction relative to the container).

18 Claims, 7 Drawing Sheets

(51) Int. Cl.
*E04B 1/14* (2006.01)
*E04B 1/61* (2006.01)
*E04C 2/292* (2006.01)

(56) References Cited

U.S. PATENT DOCUMENTS

| | | | | |
|---|---|---|---|---|
| 1,402,949 A * | 1/1922 | Nichols | B65D 90/08 | 220/681 |
| 1,631,051 A * | 5/1927 | Nichols | B65D 90/08 | 220/4.12 |
| 1,765,946 A * | 6/1930 | Shea | B65D 90/08 | 220/565 |
| 1,842,735 A * | 1/1932 | Spence | B65D 90/08 | 220/200 |
| 1,966,244 A * | 7/1934 | Hansen | B65D 90/08 | 220/4.12 |
| 2,378,128 A * | 6/1945 | Cates | B65D 90/205 | 217/3 CB |
| 2,750,013 A * | 6/1956 | Johnson | B65D 90/08 | 52/193 |
| 2,942,454 A * | 6/1960 | Jackson | E04B 2/56 | 52/249 |
| 3,014,559 A * | 12/1961 | Rogers | B65D 90/026 | 52/245 |
| 3,823,842 A * | 7/1974 | Chang | B65D 90/028 | 220/4.12 |
| 3,877,085 A * | 4/1975 | Bukaitz | E04H 4/0018 | 4/488 |
| 4,028,859 A * | 6/1977 | Bellagamba | E04C 2/292 | 52/393 |
| 4,177,614 A * | 12/1979 | Arp | E04H 4/0043 | 4/506 |
| 4,186,539 A * | 2/1980 | Harmon | E04B 1/6129 | 52/580 |
| 4,207,716 A * | 6/1980 | Moldrup | E04H 7/20 | 52/223.3 |
| 4,305,518 A * | 12/1981 | Boyd | B65D 90/08 | 220/4.13 |
| 4,774,794 A * | 10/1988 | Grieb | E04C 2/2885 | 52/309.12 |
| 5,279,089 A * | 1/1994 | Gulur | E04B 7/22 | 52/284 |
| 5,343,665 A * | 9/1994 | Palmersten | E04B 1/6129 | 52/586.1 |
| 5,348,778 A * | 9/1994 | Knipp | B32B 3/06 | 312/400 |
| 5,349,796 A * | 9/1994 | Meyerson | E04B 1/14 | 52/309.11 |
| 5,927,032 A * | 7/1999 | Record | E04C 2/288 | 52/284 |
| 6,058,521 A * | 5/2000 | O'Brien | E04H 4/0043 | 4/492 |
| 6,282,863 B1 * | 9/2001 | Christian | E04H 7/30 | 182/128 |
| 6,314,701 B1 * | 11/2001 | Meyerson | E04C 2/292 | 52/309.9 |
| 6,715,243 B1 * | 4/2004 | Fons | E04H 7/30 | 220/4.12 |
| 8,316,615 B2 * | 11/2012 | Haridasu | E04H 12/085 | 52/745.17 |
| 2007/0277469 A1 * | 12/2007 | Marker | E04B 2/7453 | 52/582.1 |
| 2008/0104745 A1 * | 5/2008 | Beaudoin | E04H 4/0043 | 4/506 |
| 2010/0140262 A1 * | 6/2010 | Whitener | B65D 90/24 | 220/4.12 |
| 2010/0236182 A1 * | 9/2010 | Mackenzie | E04C 3/30 | 52/588.1 |
| 2011/0173925 A1 * | 7/2011 | Brown | E04B 1/14 | 52/794.1 |
| 2012/0223073 A1 * | 9/2012 | Lovelace | B65D 90/205 | 220/4.28 |
| 2013/0098906 A1 * | 4/2013 | Lovelace | B65D 90/205 | 220/4.12 |
| 2013/0319552 A1 * | 12/2013 | Svarczkopf | B65D 13/00 | 137/565.01 |

* cited by examiner

ENCAPSULATED PANEL SYSTEMS

BACKGROUND

Insulation often covers containers that store a product in extreme temperatures, such as very low temperatures. Some insulation is formed of fiberglass, foam or wool. However, these types of insulations are often relatively fragile, in the case of fiberglass and foam. Given the fragile qualities of the fiberglass and foam, battering weather (e.g., blizzards, tornadoes, freezing rain, ice, sleet, extreme temperatures, extreme changes temperature, etc.), vermin, insects, and/or human activity can damage and compromise a protective covering (e.g., jacketing, sheeting, cladding, foil, etc.) and the insulation behind the protective covering. Thereafter, the insulation might no longer be effective. Because the compromised insulating material must be disposed of and new insulation must be obtained, the cost of repairing the compromised insulation is increased. In addition, some undamaged or uncompromised insulation systems covering tanks may absorb moister, after which the insulation is no longer effective. Further, the covering of the tanks with insulation may be labor intensive, again driving up a cost of insulating tanks.

Thus, there remains a need to develop new tank insulations formed of materials which are much more durable than existing protective coverings, are much faster to install than existing tank insulations, and/or are more cost effective than existing tank insulations.

BRIEF SUMMARY

This Brief Summary is provided to introduce simplified concepts relating to insulated panel systems for covering a container and techniques for covering a container which are further described below in the Detailed Description. This Summary is not intended to identify essential features of the claimed subject matter, nor is it intended for use in determining the scope of the claimed subject matter.

This disclosure relates to insulated panel systems including cores of insulating material, coated with or otherwise encapsulated in a shell material, and techniques for installing such assemblies. In some embodiments, such insulated panel systems quickly and easily removeably cover and insulate containers and, in the event of battering weather, vermin, insects, and/or human activity, such insulated panel systems remain undamaged and uncompromised, and insulate the container.

In some examples the insulated panel system may include a first encapsulated panel coupleable to a second encapsulated panel. For example, the first encapsulated panel and/or the second encapsulating panel may include a channel connection the couples the first and second encapsulated panels to allow the insulated panel system to removeably cover the exterior of the container. The first and second encapsulated panels may comprise an insulating layer (e.g., a foam, a fabric, an aerogel, a paper, a metal, a ceramic, a composite etc.). In one example, insulating layer can be formed of relatively less absorbent foam (e.g., closed cell polyurethane foam or sprayable closed cell polyurethane foam). The first and second encapsulated foam core panels may be used to insulate the container (e.g., a storage tank, processing tank, a panel tank, etc.) that stores liquid and/or gas.

In some examples each of the first and second encapsulated foam core panels have a foam core having an interior surface that faces the tank, an exterior surface that faces opposite the interior surface, and end surfaces. In some examples each of the foam cores are coated in a polymer that substantially covers the interior surface, the exterior surface, and the end surfaces.

In some examples the channel connection includes at least a front overlap member and a back overlap member. The front overlap member may be formed of a polymer and fixed to a portion of the polymer covering the exterior surface of the foam core of the first encapsulated foam core panel. The back overlap member may be formed of a polymer and fixed to a portion of the polymer covering the interior surface of the foam core of the first encapsulated foam core panel. The front and back overlap members may be arranged to overlap a portion of the polymer covering the exterior surface and interior surface of the foam core of second encapsulated foam core panel. For example, the front and back overlap members may cooperatively receive, and interface with, the second encapsulated foam core panel to removeably cover the exterior of the container.

In some examples, the first encapsulated foam core panel may further include a drip edge. The drip edge may be formed of a polymer and fixed to another portion of the polymer covering the exterior surface of the foam core of the first encapsulated foam core panel. The drip edge may extend beyond at least one of the end surfaces of the foam core of the first encapsulated foam core panel and provide for displacing moister. For example, the first encapsulated foam core panel may be removeably coupled to an underneath encapsulated foam core panel (e.g., a third encapsulated foam core panel arranged below the first encapsulated foam core panel) and the drip edge of the first encapsulated foam core panel may overlap a portion of the underneath encapsulated foam core panel to displace moister past an interface between the first encapsulated foam core panel and the underneath encapsulated foam core panel.

In some examples, the first encapsulated foam core panel may further include an overlap member. The overlap member may be formed of polymer and fixed to another portion of the polymer covering the interior surface of the foam core of the first encapsulated foam core panel opposite to the drip edge fixed to the other portion of the polymer covering the exterior surface of the foam core of the first encapsulated foam core panel. The overlap member may provide for overlapping a portion of the underneath encapsulated foam core panel. In this example, where the first encapsulated foam core panel includes an overlap member opposite to a drip edge, the drip edge and the overlap member may cooperatively couple the first encapsulated foam core panel and the underneath encapsulated foam core panel to allow the insulated panel system to removeably cover the exterior of the container.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As noted above, tank insulations are often labor intensive to install, repair, and/or replace. Further, tank insulations are often fragile and easily damaged and compromised because of battering weather (e.g., blizzards, tornadoes, freezing rain, ice, sleet, extreme temperatures, extreme changes temperature, etc.), vermin, insects, and/or human activity. This application describes insulated panel systems, comprising encapsulated panels having insulating cores coated in a material (e.g., a polymer), that reduce costs and require less labor to install as compared with other container insulation. These insulated panel systems are more durable compared with other container insulation, and in an event of battering weather, vermin, insects, and/or human activity remain undamaged and uncompromised and, hence, lessen the cost associated with repairing other container insulations that are damaged and compromised.

This application also describes various techniques for forming such insulated panel systems. By way of example and not limitation, the insulated panel systems herein may be used in the fields of oil and gas pipeline applications, food and beverage applications, watercraft applications, or any other applications where a container may be insulated (e.g., because the material within the container is extremely hot or cold or the environment surrounding the container is extremely hot or cold).

In general, insulated panel systems as described in this application include foam core panels that have foam cores that are encapsulated by a relatively tough polymer (e.g., a polyurea, such as sprayable polyurea) and, therefore, are relatively more durable than fiberglass insulation or other existing insulating foams. Moreover, because the foam core panels each have a foam core encapsulated by a relatively tough polymer, the insulated panel systems are less absorbent to liquid and/or gas than fiberglass insulation or other existing insulating foams. This application also describes below techniques for forming such insulated panel systems in the field. However, other the techniques for forming such insulated panel systems may also be used.

In some embodiments, the insulated panel systems may include encapsulated foam core panels each having a foam core coated in a polymer that substantially covers an interior surface, an exterior surface, and end surfaces of the foam cores to seal the foam cores. Sealing the foam cores prevents interaction between the foam cores and a surrounding environment. For example, sealing the foam cores prevents interaction between the foam cores and battering weather. In one example, the polymer coating prevents moisture from interacting with the foam cores, thus substantially increasing a usable life of the foam cores. In another example, the polymer coating prevents objects from interacting with the foam cores, thus preventing the objects from penetrating the foam cores.

In another example, the polymer coating prevents animals (e.g., mice, birds, and/or insects) from interacting with the foam cores, thus preventing animals from penetrating the foam cores. In another example, the polymer coating prevents a liquid (e.g., oil) from a leaking and/or a broken container and/or pipe from interacting with the foam cores, thus preventing the foam cores from absorbing the liquid. In all of these examples, the polymer coating protects the integrity of the foam cores.

In another example, the polymer coating prevents a difference in electrochemical potential between the insulated panel systems covering the containers, thus preventing corrosion (e.g., chemical reaction occurring by an electrochemical mechanism) of the containers. For example, because the polymer coating has an electrical resistance (e.g., in ohms $\Omega$), the polymer coating reduces, prevents or stops the flow of electrons, thus preventing corrosion of the containers. In this example, the polymer coating protects the integrity of the containers, pipes, and/or fittings associated with the containers.

In the example where the polymer coating prevents interaction between the foam cores and battering weather, the insulated foam core panels are relatively more durable than existing insulating systems. For example, because the polymer coating prevents interaction between the foam cores and battering weather, the polymer coated foam core panels can resist being damaged and remain uncompromised, thus lessening the cost associated with repairing other container insulations that are damaged and compromised by battering weather.

A wall thickness of the polymer coating may vary depending on the specific application. For example, the wall thickness of the polymer coating may be dependent on a thermal material to be coated with the polymer and/or a size of a container to be covered by the insulated panel systems. For example, the coating of polymer may have a wall thickness of at least about 1/32 inch (0.1 centimeters) to at most about 1/4 inch (0.6 centimeters). In another example, the coating of polymer may have a wall thickness of at least about 5/64 inch (0.2 centimeters).

A color of the polymer coating may vary depending on the specific application. For example, the color of the polymer coating may be dependent on a color of other neighboring containers and/or neighboring equipment. For example, the other neighboring containers and/or equipment may have a silver color and the color of the polymer coating may be the same silver color so that the insulated panel system blends in or matches the neighboring containers and/or equipment. In another example, the color of the polymer coating may be dependent on a reflectivity of other neighboring containers and/or neighboring equipment. For example, the other neighboring containers and/or equipment may comprise stainless steel, aluminum, copper, etc. that is reflective and the color of the polymer coating may have the same reflectivity so that the insulated panel system blends in or matches the neighboring containers and/or equipment. In another example, the color of the polymer coating may be dependent on whether the color of the polymer coating should absorb or reflect light. For example, the color of the polymer coating may be a dark color (e.g., black) so that the insulated panel system absorbs light, or the color of the polymer coating may be a light color (e.g., white) so that the insulated panel system reflects light.

In some embodiments, the insulated panel systems may comprise a channel connection. The channel connection may include at least a front overlap member and a back overlap member to overlap a portion of an adjacent encapsulated foam core panel. The overlap members may be formed of a plastic, a composite, a fiberglass, a ceramic, a metal etc. In one example, the front overlap member may be formed of polymer and coupled to a portion of polymer covering an exterior surface of the foam core of the first encapsulated foam core panel, and the back overlap member may be formed of polymer and fixed to a portion of polymer covering an interior surface of the foam core of the first encapsulated foam core panel, and the front and back overlap members may provide for overlapping a polymer covering an exterior surface and an interior surface of the foam core of the second encapsulated foam core panel adjacent to the first encapsulated foam core panel.

In an example where the insulated panel systems include a channel connection fixed to a first encapsulated foam core panel, the channel connection may couple the first and second encapsulated foam core panels to allow the insulated panel system to removeably cover the container. For example, the channel connection may provide for coupling the first and second encapsulated foam core panels to removeably cover the container around a perimeter of the container (i.e., in a lateral direction relative to the container). Because the channel connection may couple the first and second encapsulated foam core panels to allow the insulated panel system to removeably cover the container, the channel connection may allow the insulated panel systems to be installed and/or removed from containers in less time than other container insulations. In another example, the channel connection may allow the insulated panel systems to be installed and/or removed from containers in confined spaces. For example, the channel connection may allow the insulated panel systems to be installed and/or removed, via vertical access, from containers that are arranged within a short distance from neighboring containers and/or other structures that prevent access to portions (e.g., sides) of the containers. In another example, the channel connection may allow the insulated panel systems to be installed and/or removed with little or no power tools. For example, the channel connection may allow the insulated panel system to be installed and/or removed without using electric power tools that could possibly ignite a flammable product stored in the insulated container.

In some embodiments, the insulated panel system may comprise a drip edge. The drip edge may be formed of a plastic, a composite, a fiberglass, a ceramic, a metal etc. In one example, the drip edge may be formed of polymer and fixed to another portion of the polymer covering the exterior surface of the foam core of the first encapsulated foam core panel. The drip edge may extend beyond at least one of the end surfaces of the foam core of the first encapsulated foam core panel. The drip edge may overlap at least a portion of an underneath encapsulated foam core panel (e.g., a third encapsulated foam core panel arranged below the first encapsulated foam core panel) to displace moister past at least an interface between the first encapsulated foam core panel and the underneath encapsulated foam core panel. In some embodiments, the insulated panel system may comprise a drip edge and an overlap member. For example, the first encapsulated foam core panel may further include an overlap member formed of polymer and fixed to another portion of the polymer covering the interior surface of the foam core of the first encapsulated foam core panel opposite to the drip edge fixed to the other portion of the polymer covering the exterior surface of the foam core of the first encapsulated foam core panel.

In an example where the insulated panel systems include a drip edge and an overlap member fixed to the first encapsulated foam core panel, the drip edge and the overlap member may cooperatively couple the first encapsulated foam core panel to the underneath encapsulated foam core panel to allow the insulated panel system to removeably cover the container. For example, the cooperating drip edge and overlap member may provide for coupling the first encapsulated foam core panel and the underneath encapsulated foam core panel to removeably cover the container vertically along a height of the container (i.e., in a vertical direction relative to the container). Because the cooperating drip edge and overlap member may couple the first encapsulated foam core panel and the underneath encapsulated foam core panel to allow the insulated panel system to removeably cover the container, the cooperating drip edge and overlap member may allow the insulated panel systems to be installed and/or removed from containers in less time than other container insulations. In another example, the cooperating drip edge and overlap member may allow the insulated panel systems to be installed and/or removed from containers in confined spaces. For example, the cooperating drip edge and overlap member may allow the insulated panel systems to be installed and/or removed, via vertical access, from containers that are arranged within a short distance from neighboring containers and/or other structures that prevent access to portions (e.g., sides) of the containers. In another example, the cooperating drip edge and overlap member may allow the insulated panel systems to be installed and/or removed with little or no power tools. For example, the cooperating drip edge and overlap member may allow the insulated panel system to be installed and/or removed without using electric power tools that could possibly ignite a fuel stored in the insulated container.

In some embodiments, the first and second encapsulated foam core panels may comprise substantially curvilinear shaped panels of foam cores having an arc to fit on an exterior of a cylindrical container. For example, the exterior of the container may comprise a curvilinear shape having an arc, and the foam cores encapsulated in polymer may comprise a curvilinear shape having an arc equal to the arc of the exterior of the container to fit on the exterior of the cylindrical container. An arc of the first and second encapsulated foam core panels may vary depending on the specific application. In one example, the first and second encapsulated foam core panels may have an arc equal to an arc of an exterior of a container having a diameter of about 12 feet (3.5 meters). In another example, the first and second encapsulated foam core panels may have an arc equal to an arc of an exterior of a container having a diameter of about 14 feet (4 meters). In another example, the first and second encapsulated foam core panels may have an arc equal to an arc of an exterior of a container having a diameter of about 55 feet (17 meters). In another example, the first and second encapsulated foam core panels may have an arc equal to an arc of an exterior of a container having a diameter of about 1 foot (0.3 meters). In another example, the first and second encapsulated foam core panels may have an arc equal to an arc of an exterior of a container having a diameter of at least about 1 foot (0.3 meters) to at most about 120 feet (37 meters).

Similarly, the thickness of the first and second encapsulated foam core panels may vary depending on the specific application. In some examples, the first and second encapsulated foam core panels may have a thickness of between about ½ inch (1.3 centimeters) and about 16 inches (40 centimeters); however, in other examples, the thickness of the first and second core sections may be less than ½ inches (1.3 centimeters) or greater than 16 inches (40 centimeters). In a specific example, the first and second encapsulated foam core panels may have a thickness of about 8 inches (20 centimeters).

In other embodiments, the first and second encapsulated foam core panels may comprise fastening members to removeably couple the first and second encapsulated foam core panels. For example, the first encapsulated foam core panel may comprise one or more of a threaded fastener (e.g., a nut, a tee nut, a prong tee nut, a propel nut, etc.), a snap-fit clip, a press-fit clip, etc. arranged in the front and/or back overlap members of the channel connection. In this example, where the first encapsulated foam core panel may comprise one or more of a threaded fastener (e.g., a nut, a tee nut, a prong tee nut, a propel nut, etc.), a snap-fit clip, a press-fit clip, etc. arranged in the front and/or back overlap members of the channel connection, the encapsulated foam core panel may comprise one or more of a cooperating threaded fastener (e.g., threaded bolt, etc.), a snap-fit clip, a press-fit clip, etc. arranged in the second encapsulated foam core panel to removeably couple the first and second encapsulated foam core panels.

In another example, the first and second encapsulated foam core panels may comprise a catch member arranged on the first and second encapsulated foam core panels to receive a retaining member. For example, the first and second encapsulated foam core panels may comprise one or more hooks, loops, notches, grooves, knobs, studs, etc. arranged on exterior surfaces of the first and second encapsulated foam core panels to receive the retaining member 134.

Also, in some embodiments, the polymer coating on the interior surface, the exterior surface, and the end surfaces of the foam cores of the first and second encapsulated foam core panels may be at least about ⅛ inch (0.3 centimeters) thick to at most about ¼ (0.6 centimeters) thick. However, the polymer coating on the interior surface, the exterior surface, and the end surfaces of the foam cores of the first and second encapsulated foam core panels need not be the same. In one example, the polymer coating on the exterior surface and/or the end surfaces may be thicker than the polymer coating on the interior surfaces. In another example, the exterior surface and/or the end surfaces may be layered with the polymer coating, while the inside surface may not. However, in other embodiments, any other thickness of polymer coating may be used. Furthermore, the thickness of the polymer coating layered on the interior surface, the exterior surface, and/or the end surfaces of the first and second encapsulated foam core panels may be non-uniform.

Ranges of what is considered "relatively low" temperatures and "relatively high" temperatures may vary depending on the application, but in one example "relatively low" temperatures are those of at least about −60 degrees Fahrenheit (−50 degrees Celsius), and "relatively high" temperatures are those of at least about 1200 degrees Fahrenheit (650 degrees Celsius). To be clear, however, this disclosure is not limited to the foregoing ranges of low temperatures or high temperatures. Also, ranges of what is considered "relatively high" winds may vary depending on the application, but in one example "relatively high" winds are those of at least about 120 miles per hour (MPH).

These and other aspects of the insulated panel systems will be described in greater detail below with reference to several illustrative embodiments.

Examples of Insulated Panel Systems

This section describes example insulated panel systems comprising first and second encapsulated panels coated in a polymer. These and numerous other insulated panel systems can be formed according to the techniques described in this section.

Figure 1:
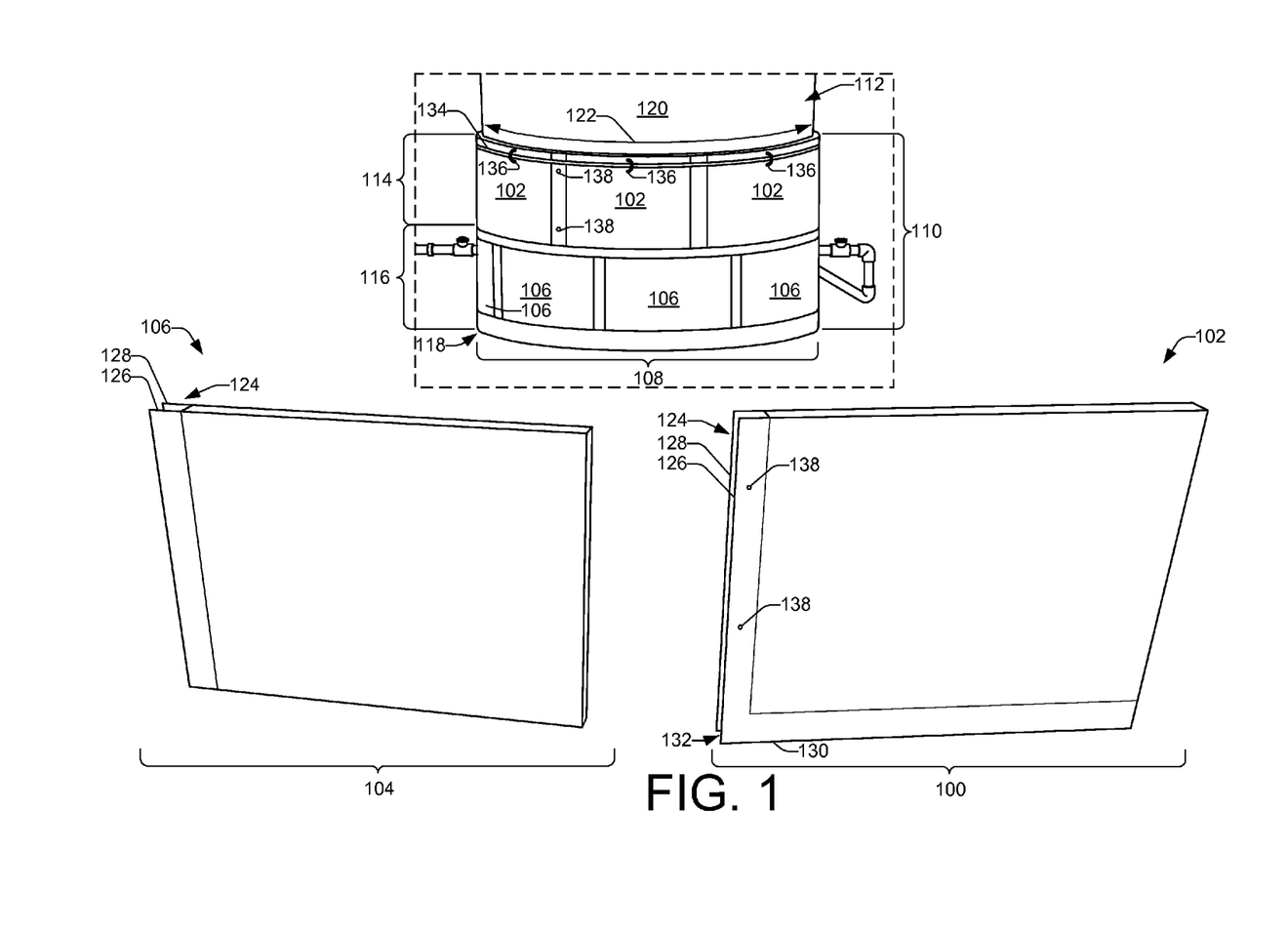
FIG. 1 illustrates a perspective view of a first encapsulated foam core panel, a perspective view of a second encapsulated foam core panel, and a perspective view of an insulated panel system arranged on a container.

FIG. 1 illustrates a perspective view 100 of a first encapsulated foam core panel 102, a perspective view 104 of a second encapsulated foam core panel 106, and a perspective view 108 of an insulated panel system 110 arranged on a container 112. The container 112 may comprises a storage tank, a processing tank, a panel tank, etc. for storing a fluid or a gas. As shown in FIG. 1, the insulated panel system 110 comprises a row 114 of the first encapsulated foam core panels 102 covering the container 112 and coupled to a row 116 of the second encapsulated foam core panels 106 covering the container 112. While FIG. 1 shows rows 114 and 116 covering the container 112, one or more additional rows of encapsulated foam core panels may be coupled together and cover the container 112. For example, another one of the row 114 of the first encapsulated foam core panels 102 may be coupled to the row 114 of the first encapsulated foam core panels 102. For example, a quantity of the first encapsulated foam core panels 102 may be arranged above, and coupled to, the row 114 of the first encapsulated foam core panels 102 arranged beneath the quantity of the first encapsulated foam core panels 102. Moreover, while FIG. 1 shows the row 116 of the second encapsulated foam core panels 106 arranged adjacent to a bottom 118 of the container 112, other encapsulated foam core panels may be arranged adjacent to the bottom 118 of the container 112. For example, one or more of the first encapsulated foam core panels 106 may be arranged adjacent to the bottom 118 of the container 112. Further, while FIG. 1 shows the container 112 having an exterior 120 that is substantially curvilinear shaped and having an arc 122, the container 112 may have any shape. For example, the container may have a rectilinear shape, a triangular shape, rectangular shape, hexagonal shape, octagonal shape, etc.

Each of the first and second encapsulated foam core panels 102 and 106 may comprise a channel connection 124. The channel connection 124 may include at least a front overlap member 126 and a back overlap member 128. The front and back overlap members 126 and 128 of may provide for overlapping a portion of another encapsulated foam core panel. For example, the channel connection 124 may provide for coupling the first and second encapsulated foam core panels 102 and 106 to removeably cover the container around a perimeter of the container 112 (i.e., in a lateral direction relative to the container). For example, the channel connection 124 may provide for coupling the first encapsulated foam core panels 102 in a lateral direction relative to the container 112 to form the row 114 of the first encapsulated foam core panels 102 around the perimeter of the container 112. For example, a channel connection 124 of a first encapsulated foam core panel 102 may removeably receive at least a portion of an end of a first encapsulated foam core panel 102 arranged in the row 114 of the first encapsulated foam core panels 102. Similarly, the channel connection 124 of the second encapsulated foam core panel 106 may provide for coupling the second encapsulated foam core panels 106 in the lateral direction relative to the container 112 to form the row 116 of the second encapsulated foam core panels 106 around the perimeter of the container 112. For example, a channel connection 124 of a second encapsulated foam core panel 106 may removeably receive at least a portion of an end of a second encapsulated foam core panel 106 arranged in the row 116 of the second encapsulated foam core panels 106.

While FIG. 1 illustrates a respective channel connection 124 fixed to each of the first and second encapsulated foam core panels 102 and 106, the channel connection 124 may not be fixed to either of the first and second encapsulated foam core panels 102 and 106. For example, the channel connection 124 may be a separate unit arranged to receive an end of encapsulated panels. For example, the channel connection 124 may be a separate unit formed of polymer and comprising a channel to receive an ends of encapsulated panels arranged adjacent to each other in a row of encapsulated panels.

The first encapsulated foam core panel 102 may include a drip edge 130. The drip edge 130 may provide for overlapping at least a portion of an underneath encapsulated foam core panel to displace moister past at least an interface between the first encapsulated foam core panel and the underneath encapsulated foam core panel. For example, the drip edge 130 of a first encapsulated foam core panel 102 arranged in the row 114 of the first encapsulated foam core panels 102 may displace moister past an interface between the first encapsulated foam core panel 102 and a second encapsulated foam core panel 106 arranged in the row 116 of the second encapsulated foam core panels 106 below the first encapsulated foam core panel 102 arranged in the row 114 of first encapsulated foam core panels 102.

The first encapsulated foam core panel 102 may include an overlap member 132 opposite to the drip edge 130. The overlap member 132 may provide for overlapping a portion of an underneath encapsulated foam core panel. For example, overlap member 132 may overlap a portion of a second encapsulated foam core panel 106 arranged in the row 116 of the second encapsulated foam core panels 106 arranged below the row 114 of the first encapsulated foam core panels 102. The drip edge 130 and the overlap member 132 may cooperatively couple the first encapsulated foam core panel to the underneath encapsulated foam core panel to allow the insulated panel system to removeably cover the container. For example, the cooperating drip edge 130 and overlap member 132 may provide for coupling a first encapsulated foam core panel 102 arranged in the row 114 of the first encapsulated foam core panels 102 and a second encapsulated foam core panel 106 arranged in the row 116 of the second encapsulated foam core panels 106 to removeably cover the container 112 vertically along a height of the container 112 (i.e., in a vertical direction relative to the container 112).

While FIG. 1 illustrates the drip edge 130 and overlap member 132 fixed to the first encapsulated foam core panel 102, the drip edge 130 and overlap member 132 may not be fixed to the first encapsulated foam core panel 102. For example, the drip edge 130 and overlap member 132 may be a separate unit arranged to receive an end of encapsulated panels.

The insulated panel system 110 may include at least one retaining member 134. While FIG. 1 illustrates the retaining member 134 arranged around the first encapsulated foam core panels 102 arranged in the row 114 of the first encapsulated foam core panels 102 to hold the first encapsulated foam core panels 102 on the exterior 120 of the container 112, the retaining member 134 may be arranged the second encapsulated foam core panels 106 to hold the second encapsulated foam core panels 106 on the exterior 120 of the container 112. The retaining member 134 may be a strap, a band, a cable tie (e.g., tie-wrap, zip tie, hose tie, etc.), a wire, etc. In one example, the retaining member 134 may be steel strapping. In one example, the steel strapping may include a threaded fastener (e.g., worm drive fastener) that couples with the steel strap to tighten the steel strap down on to the foam core panels.

FIG. 1 illustrates the first encapsulated foam core panels 102 may comprise a catch member 136 arranged on the first encapsulated foam core panels 102 to receive a retaining member. While FIG. 1 illustrates the catch member 136 comprising a loop, the catch member 136 may comprise hooks, notches, grooves, knobs, studs, etc. arranged on the first encapsulated foam core panels 102 to receive at least one strap arranged around the exterior surface of the first encapsulated foam core panel 102 to hold the first encapsulated foam core panel 102 on the exterior 120 of the container 112. Also, while FIG. 1 illustrates the catch member 136 arranged on the first encapsulated foam core panels 102, the catch member 136 may be arranged on the second encapsulated foam core panels 106. For example, the catch members 136 may be arranged on the second encapsulated foam core panels 102 to hold the second encapsulated foam core panel on the exterior 120 of the container 112. In some example, the catch members may not be needed.

FIG. 1 illustrates the first encapsulated foam core panels 102 may comprise a fastening member 138 arranged with the channel connection 124 of first encapsulated foam core panels 102 removeably couple to an adjacent encapsulated foam core panel. The fastening member 138 may comprise a threaded fastener (e.g., a nut, a tee nut, a prong tee nut, a propel nut, etc.), a snap-fit clip, a press-fit clip, etc. arranged in the front and/or back overlap members 126 and 128 of the channel connection 124. While FIG. 1 illustrates the fastening member 138 arranged with the first encapsulated foam core panels 102, the fastening member 138 may be arranged with the second encapsulated foam core panels 106. For example, the fastening member 138 may be arranged in the front and/or back overlap members 126 and 128 of the channel connection 124 of the second encapsulated foam core panels 106.

Figure 2:
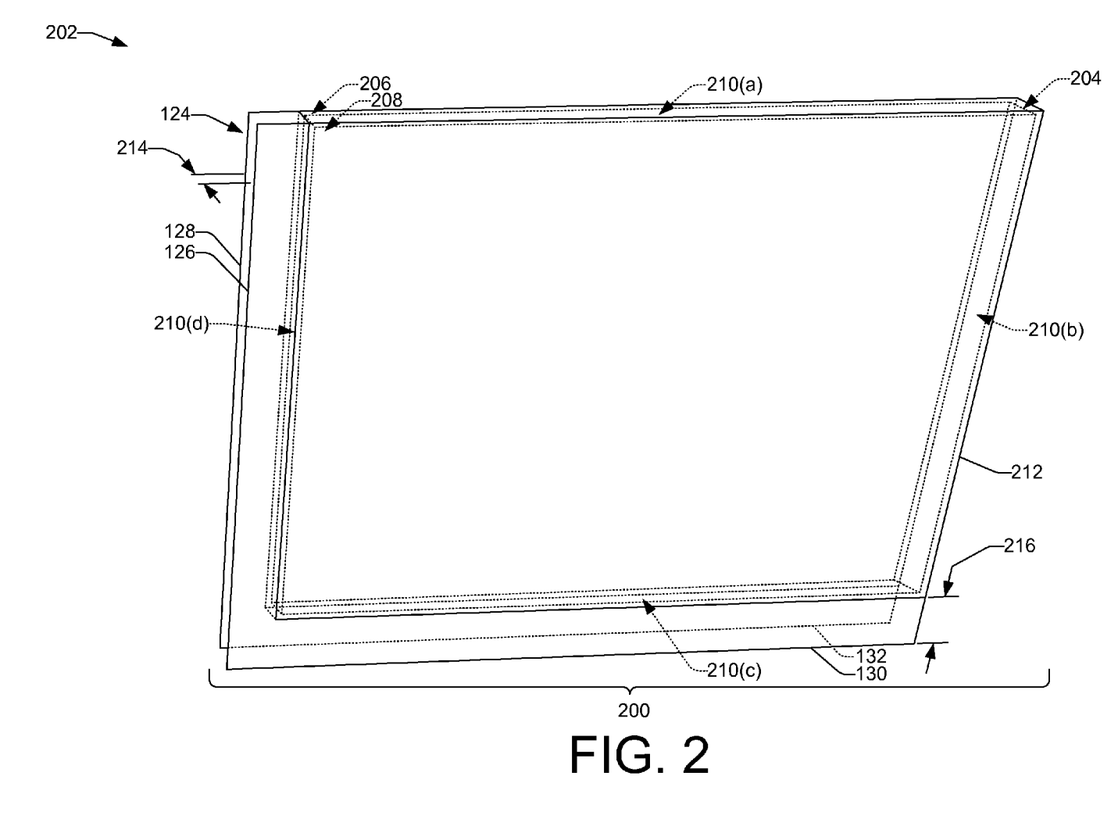
FIG. 2 illustrates a perspective view of an encapsulated foam core panel.

FIG. 2 illustrates a perspective view 200 of an encapsulated foam core panel 202, the encapsulated foam core panel 202 can be an example of the first encapsulated foam core panel 102 illustrated in FIG. 1. The encapsulated foam core panel 202 may have a foam core 204 having an interior surface 206 that faces the container, an exterior surface 208 that faces opposite the interior surface 206, and end surfaces 210(a), 210(b), 210(c) and 210(d). The foam core 204 may be formed of foam, a fabric, an aerogel, a paper, a metal, a ceramic, a composite etc. In one example, the foam core 204 may be formed of relatively less absorbent foam (e.g., closed cell foam, closed cell polyurethane foam, or sprayable closed cell polyurethane foam).

FIG. 2 illustrates, in this embodiment, the foam core 204 may be coated in a polymer 212 that substantially covers the interior surface 206, the exterior surface 208, and the end surfaces 210(a)-210(d). However, in other embodiments, the interior surface 206 and/or end surfaces 210(a)-210(d) of the foam core 204 need not be covered with the polymer 212 and may be void of the polymer 212. The polymer 212 substantially covering the interior surface 206, the exterior surface 208, and the end surfaces 210(a)-210(d) may define a shell, and may seal and/or strengthen the foam core 204. In one example, the polymer 212 may comprise a relatively tough polymer (e.g., a polyurea such as a sprayable polyurea).

The front overlap member 126 of the channel connection 124 may be formed of polymer and fixed to a portion of the polymer 212 covering the exterior surface 208 of the foam core 204. The back overlap member 128 of the channel connection 124 may be formed of polymer and fixed to a portion of the polymer 212 covering the interior surface 206 of the foam core 204. In one example, the front overlap member 126 may be formed of a polymer sprayed on to the polymer 212 covering the exterior surface 208 of the foam core 204 and the back overlap member 128 may be formed of a polymer sprayed on to the polymer 212 covering interior surface 206 of the foam core 204. In this example, the front overlap member 126 and the back overlap member 128 may be formed of the same polymer as the polymer 212 covering the foam core 204. Moreover, the front overlap member 126 and the back overlap member 128 may be chemically bonded to the polymer 212 covering the foam core 204. In another example, the front overlap member 126 and the back overlap member 128 may be pre-formed sheets of polymer. In this example, the front overlap member 126 and the back overlap member 128 may be fixed to the polymer 212 covering the exterior surface 208 and the interior surface 206 of the foam core 204 by coating (e.g., spraying) the pre-formed sheets of polymer with a polymer formed of the same polymer 212 covering foam core 204.

The front and back overlap members 126 and 128 may overlap a portion of a polymer covering an exterior surface and an interior surface of a foam core of another encapsulated foam core panel. For example, the front and back overlap members 126 and 128 may be separated by a distance 214 to removeably receive a portion of a polymer covering an exterior surface and an interior surface of a foam core of another encapsulated foam core panel arranged adjacent the encapsulated foam core panel 202. For example, the distance 214 may be about the same as a thickness of an end of another encapsulated foam core panel to provide for slideably displacing the end of the other encapsulated foam core panel between the front and back overlap members 126 and 128.

FIG. 2 illustrates the drip edge 130 may be formed of polymer and fixed to another portion of the polymer 212 covering the exterior surface 208 of the foam core 204. In one example, the drip edge 130 may be formed of a polymer sprayed on to the polymer 212 covering the exterior surface 208 of the foam core 204. In this example, the drip edge 130 may be formed of the same polymer as the polymer 212 covering the foam core 204. Moreover, the drip edge 130 may be chemically bonded to the polymer 212 covering the foam core 204. In another example, the drip edge 130 may be a pre-formed sheet of polymer. In this example, the drip edge 130 may be fixed to the polymer 212 covering the exterior surface 208 of the foam core 204 by coating (e.g., spraying) the pre-formed sheet of polymer with a polymer formed of the same polymer 212 covering foam core 204. The drip edge 130 may extend beyond at least one of the end surfaces 210(a)-210(d) of the foam core 204. For example, the drip edge 130 may extend a distance 216 beyond the end surface 210(c) to overlap an exterior top portion of an underneath encapsulated foam core panel (e.g., a second encapsulated foam core panel 106 arranged in the row 116 of the second encapsulated foam core panels).

FIG. 2 illustrates the overlap member 132 may be formed of polymer and fixed to another portion of the polymer 212 covering the interior surface 206 of the foam core 204. In one example, the overlap member 132 may be formed of a polymer sprayed on to the polymer 212 covering the exterior surface 208 of the foam core 204. In this example, the overlap member 132 may be formed of the same polymer as the polymer 212 covering the foam core 204. Moreover, the overlap member 132 may be chemically bonded to the polymer 212 covering the foam core 204. In another example, the overlap member 132 may be a pre-formed sheet of polymer. In this example, the overlap member 132 may be fixed to the polymer 212 covering the exterior surface 208 of the foam core 204 by coating (e.g., spraying) the pre-formed sheet of polymer with a polymer formed of the same polymer 212 covering foam core 204. The overlap member 132 may be arranged along the end surface 210(c) opposite to the drip edge 130 fixed to the other portion of the polymer 212 covering the exterior surface 208 of the foam core 204. The drip edge 130 and the overlap member 132 may overlap a portion an underneath encapsulated foam core panel. For example, the drip edge 130 and the overlap member 132 may overlap a portion of a second encapsulated foam core panel 106 arranged in the row 116 of the second encapsulated foam core panels arranged below the encapsulated foam core panel 202. The drip edge 130 and the overlap member 132 may cooperatively couple the encapsulated foam core panel 202 and the underneath encapsulated foam core panel (e.g., a second encapsulated foam core panel 106 arranged in the row 116 of the second encapsulated foam core panels) to allow the encapsulated foam core panel 202 to removably cover the exterior 120 of the container 112. For example, the cooperating drip edge 130 and overlap member 132 may provide for coupling the encapsulated foam core panel 202 to a second encapsulated foam core panel 106 arranged below and in the row 116 of the second encapsulated foam core panels 106 to removeably cover the container 112 vertically along a height of the container 112 (i.e., in a vertical direction relative to the container 112). Similar to the channel connection 124, the drip edge 130 and overlap member 132 may be separated by the distance 214 to removeably receive a portion of a polymer covering an exterior surface and an interior surface of a foam core of another encapsulated foam core panel arranged below the encapsulated foam core panel 202.

Figure 3:
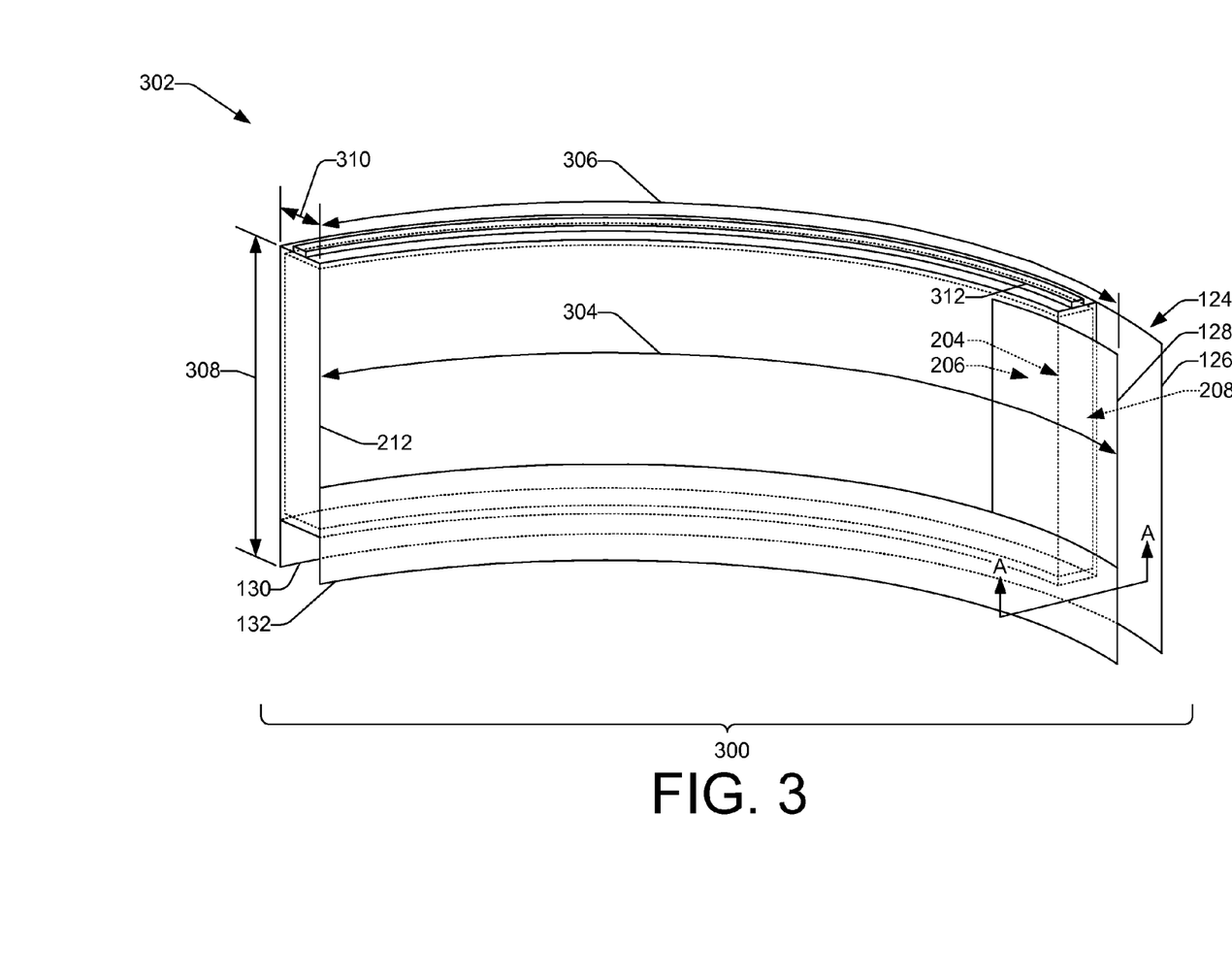
FIG. 3 illustrates a perspective view of another embodiment of an encapsulated foam core panel.

FIG. 3 illustrates a perspective view 300 of another embodiment of an encapsulated foam core panel 302, the encapsulated foam core panel 302 can be an example of the first encapsulated foam core panel 102 illustrated in FIG. 1. FIG. 3 illustrates the encapsulated foam core panel 302 may comprise a curvilinear shape having an arc 304. The arc 304 may be equal to the arc 122 of the exterior 120 of the container 112. For example, the arc 304 may be equal to an arc of an exterior of a container having a diameter of at least about 1 foot (0.3 meters) to at most about 120 feet (37 meters). In some embodiments, the foam core 204 may be cut (e.g., bandsaw cut, laser cut, water jet cut, etc.) from a block of foam to have the arc 304. In other embodiments, the foam core 204 may be molded to have the arc 304.

FIG. 3 illustrates the encapsulated foam core panel 302 may comprise a length 306 of at least about 24 inches to at most about 96 inches, a width 308 of at least about 12 inches to at most about 48 inches, and a thickness 310 of at least about 1 inch to at most about 16 inches.

The encapsulated foam core panel 302 may comprise a mechanical seal 312. The mechanical seal 312 may be fixed to an end surface of the encapsulated foam core panel 302 to seal the encapsulated foam core panel 302 to the another encapsulated foam core panel. While FIG. 3 illustrates the mechanical seal 312 fixed to a top end surface of the encapsulated foam core panel 302, the mechanical seal 312 may be fixed to any end surface of the encapsulated foam core panel 302. In one example, the mechanical seal 312 may comprise a gasket. For example, the mechanical seal 312 may comprise a sheet gasket or an O-ring. In another example, the mechanical seal 312 may comprise weatherstripping (e.g., a strip or tube of poly foam, rubber, vinyl, felt, etc.).

While FIG. 3 illustrates the back overlap member 128 formed of a single unit of polymer fixed to a portion of the polymer 212 covering the interior surface 206 of the foam core 204, the overlap member 128 may be formed of two or more units of polymer fixed to a portion of the polymer 212 covering the interior surface 206 of the foam core 204. Similarly, while FIG. 3 illustrates the overlap member 132 formed of a single unit of polymer fixed to another portion of the polymer 212 covering the interior surface 206 of the foam core 204, the overlap member 128 may be formed of two or more units of polymer fixed to another portion of the polymer 212 covering the interior surface 206 of the foam core 204.

FIG. 3 illustrates a section line A-A. The section line A-A is approximate to the drip edge 130 and the overlap member 132 of encapsulated foam core panel 302.

Figure 4:
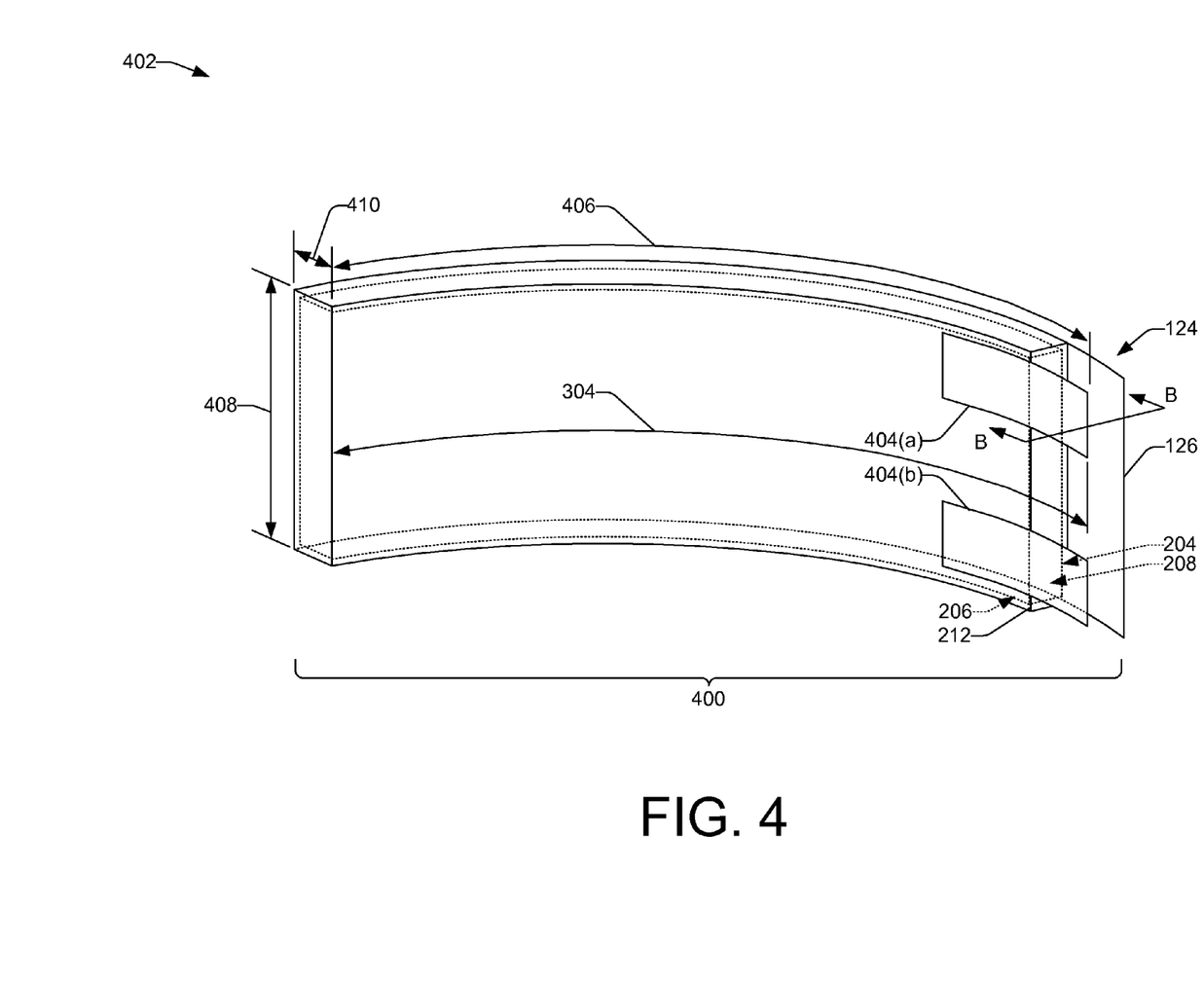
FIG. 4 illustrates a perspective view of another embodiment of an encapsulated foam core panel.

FIG. 4 illustrates a perspective view 400 of another embodiment of an encapsulated foam core panel 402, the encapsulated foam core panel 402 can be an example of the second encapsulated foam core panel 106 illustrated in FIG. 1. FIG. 4 illustrates the channel connection 124 may comprise a first back overlap member 404(a) and a second back overlap member 404(b). Similar to the overlap member 128 discussed above, each of the overlap members 404(a) and 404(b) may be formed of polymer and fixed to a portion of the polymer 212 covering the interior surface 206 of the foam core 204. FIG. 4 illustrates the encapsulated foam core panel 402 may comprise the curvilinear shape having the arc 304 equal to the arc 122 of the exterior 120 of the container 112. The encapsulated foam core panel 402 may comprise a length 406 of at least about 24 inches to at most about 96 inches, a width 408 of at least about 12 inches to at most about 48 inches, and a thickness 410 of at least about 1 inch to at most about 16 inches.

FIG. 4 illustrates a section line B-B. The section line B-B is approximate to channel connection 124 of encapsulated foam core panel 402.

Figure 5:
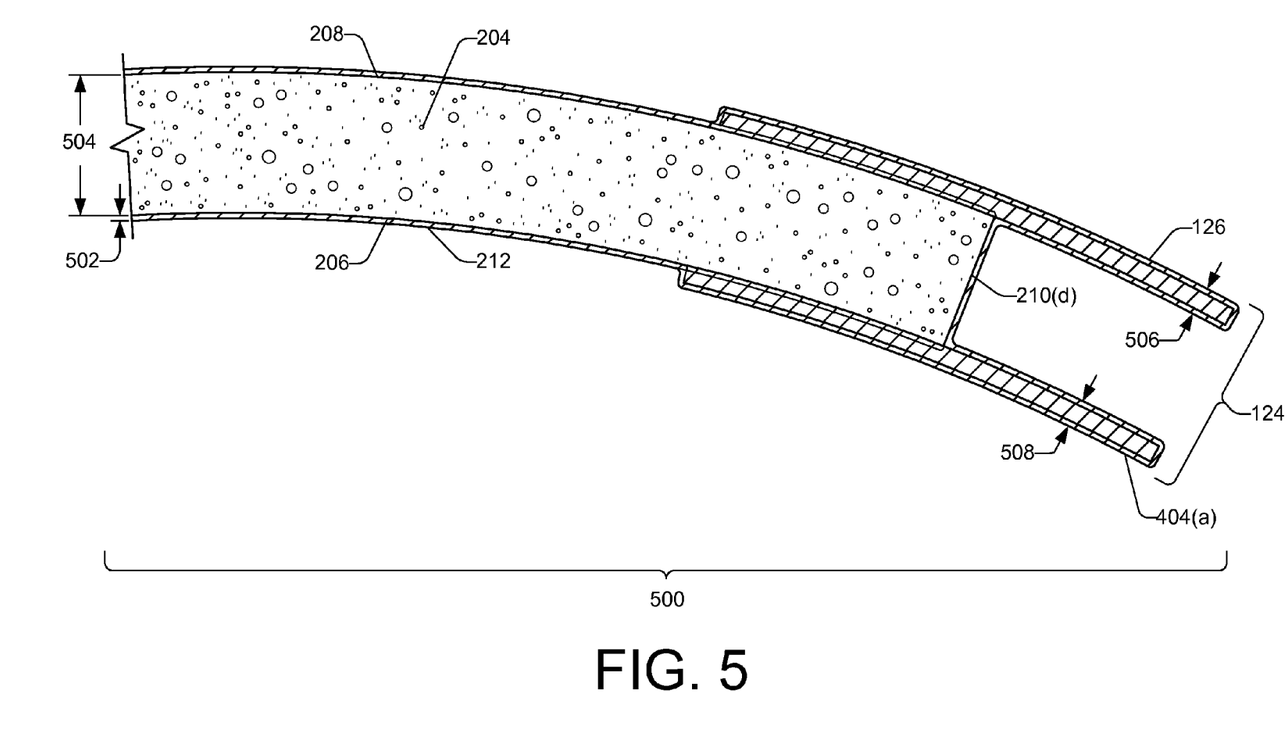
FIG. 5 illustrates a cross-section view of the channel connection illustrated in FIG. 4.

FIG. 5 illustrates a cross-section view 500 of the channel connection 124 taken along the section line B-B. Cross-section view 500 illustrates the foam core 204 coated in the polymer 212 that substantially covers the interior surface 206, the exterior surface 208, and the end surfaces 210(a)-210(d) (end surfaces 210(a), 210(b) and 210(c) not shown). The coating of polymer 212 may have a wall thickness 502 of at least about 5/64 inch (0.2 centimeters). In one example, the polymer 212 may comprise a relatively tough polymer (e.g., a polyurea such as a sprayable polyurea).

Cross-section view 500 illustrates the foam core 204 may have a cross-sectional thickness 504 of about 8 inches (20 centimeters). The foam core 204 may be formed of foam, a fabric, an aerogel, a paper, a metal, a ceramic, a composite etc. In one example, the foam core 204 may be formed of relatively less absorbent foam (e.g., closed cell foam, closed cell polyurethane foam, or sprayable closed cell polyurethane foam).

Cross-section view 500 illustrates the front overlap member 126 of the channel connection 124 may be formed of polymer and fixed to a portion of the polymer 212 covering the exterior surface 208 of the foam core 204. While cross-section view 500 illustrates the front overlap member 126 may comprise at least one layer of the same polymer 212 covering the exterior surface 208, the front overlap member 126 may comprise at least one layer of another polymer different from the polymer 212 covering the exterior surface 208. In one example, the front overlap member 126 may have a cross-sectional thickness 506 of about 5/64 inch (0.2 centimeters).

Cross-section view 500 illustrates the back overlap member 404(a) may be formed of polymer and fixed to a portion of the polymer 212 covering the interior surface 206 of the foam core 204. While cross-section view 500 illustrates the back overlap member 404(a) may comprise at least one layer of the same polymer 212 covering the interior surface 206, the back overlap member 404(a) may comprise at least one layer of another polymer different from the polymer 212 covering the interior surface 206. In one example, the back overlap member 404(a) may have a cross-sectional thickness 508 of about 5/64 inch (0.2 centimeters).

Figure 6:
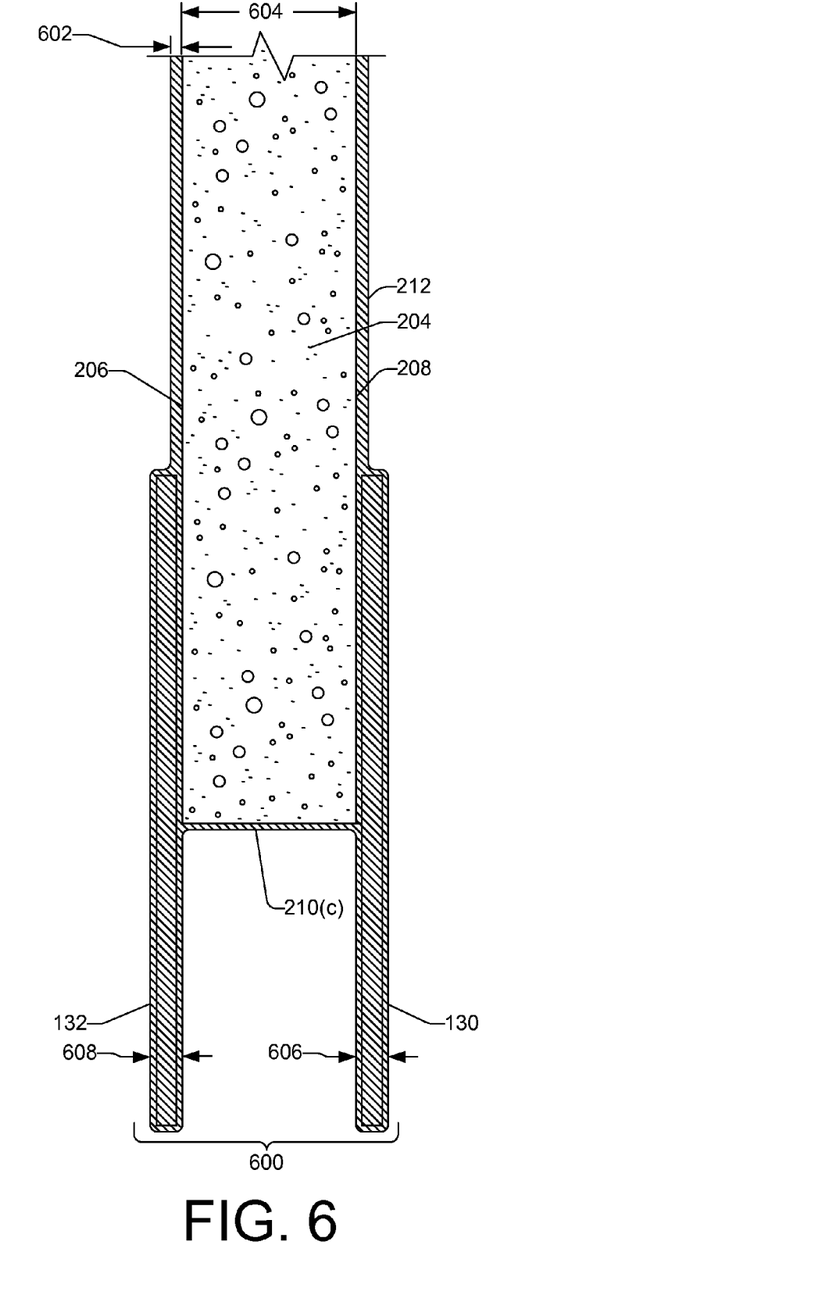
FIG. 6 illustrates a cross-section view of the drip edge and overlap member illustrated in FIG. 3.

FIG. 6 illustrates a cross-section view 600 of the drip edge 130 and the overlap member 132 taken along the section line A-A. Cross-section view 600 illustrates the foam core 204 coated in the polymer 212 that substantially covers the interior surface 206, the exterior surface 208, and the end surfaces 210(a)-210(d) (end surfaces 210(a), 210(b) and 210(c) not shown). The coating of polymer 212 may have a wall thickness 602 of at least about 5/64 inch (0.2 centimeters). In one example, the polymer 212 may comprise a relatively tough polymer (e.g., a polyurea such as a sprayable polyurea).

Cross-section view 600 illustrates the foam core 204 may have a cross-sectional thickness 604 of about 8 inches (20 centimeters). The foam core 204 may be formed of foam, a fabric, an aerogel, a paper, a metal, a ceramic, a composite etc. In one example, the foam core 204 may be formed of relatively less absorbent foam (e.g., closed cell foam, closed cell polyurethane foam, or sprayable closed cell polyurethane foam).

Cross-section view 600 illustrates the drip edge 130 may be formed of polymer and fixed to a portion of the polymer 212 covering the exterior surface 208 of the foam core 204. While cross-section view 600 illustrates the drip edge 130 may comprise at least one layer of the same polymer 212 covering the exterior surface 208, the drip edge 130 may comprise at least one layer of another polymer different from the polymer 212 covering the exterior surface 208. In one example, the drip edge 130 may have a cross-sectional thickness 606 of about 5/64 inch (0.2 centimeters).

Cross-section view 600 illustrates the overlap member 132 may be formed of polymer and fixed to a portion of the polymer 212 covering the interior surface 206 of the foam core 204. While cross-section view 600 illustrates the overlap member 132 may comprise at least one layer of the same polymer 212 covering the interior surface 206, the overlap member 132 may comprise at least one layer of another polymer different from the polymer 212 covering the interior surface 206. In one example, the overlap member 132 may have a cross-sectional thickness 608 of about 5/64 inch (0.2 centimeters).

Example Methods of Forming Insulated Panel Systems

Figure 7:
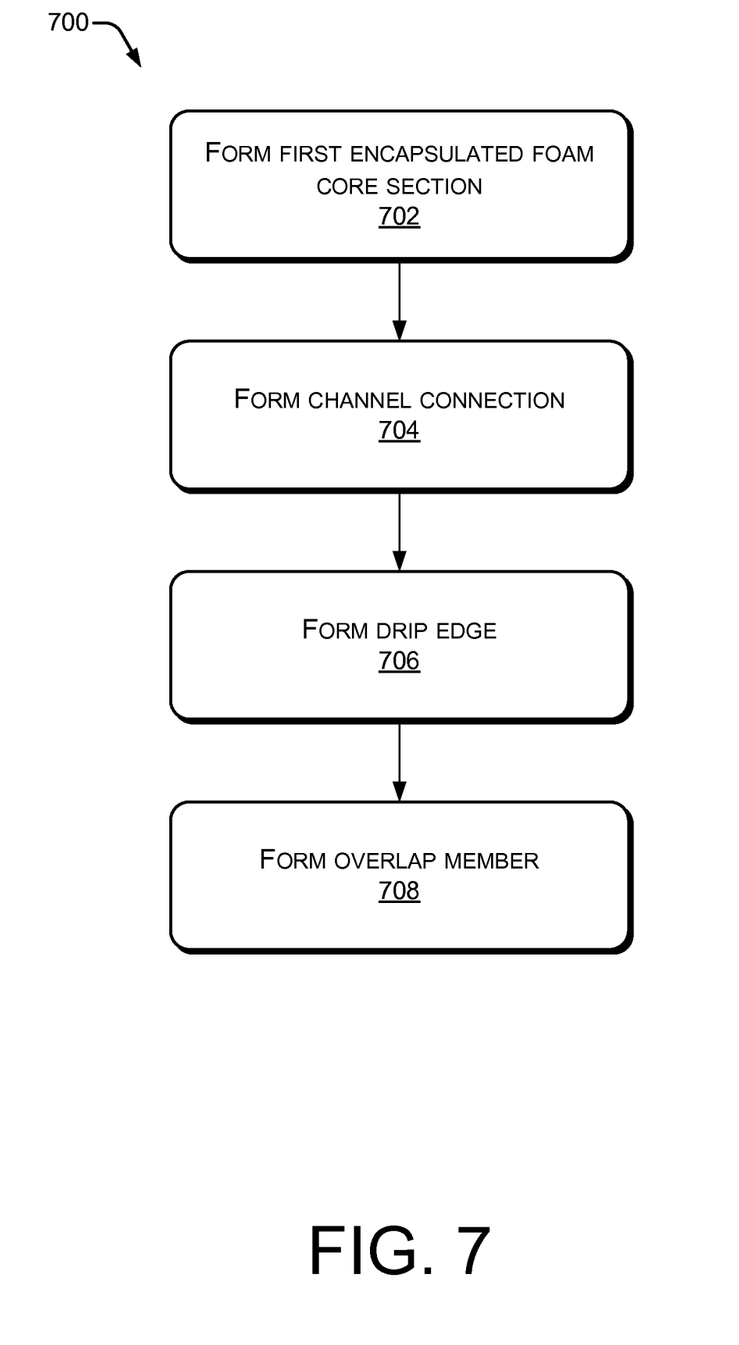
FIG. 7 is a flow diagram illustrating an example process of forming an insulated panel system for covering a container.

FIG. 7 illustrates an example process 700 of forming an insulated panel system (e.g., insulated panel system 110) to be installed on a container (e.g., container 112). By way of example and not limitation, this process may be performed at a manufacturing facility, a plant, a foundry, a factory, an oil facility, a gas facility, a boat yard, in the field, or the like.

Process 700 includes operation 702, which represents forming a first encapsulated foam core panel (e.g., first encapsulated foam core panel 102). Forming the first encapsulated foam core panel may include forming a foam core (e.g., foam core 204) having an interior surface (e.g., interior surface 206) to face the container, an exterior surface (e.g., exterior surface 208) to face opposite the interior surface, and end surfaces (e.g., end surfaces 210(*a*), 210(*b*), 210(*c*) and 210(*d*)) and coating (e.g., spraying) the foam core in a polymer (e.g., polymer 212) such that the polymer substantially covers at least the interior surface, the exterior surface, and the end surfaces. For example, relatively less absorbent foam (e.g., closed cell polyurethane foam or sprayable closed cell polyurethane foam) may be cut and/or molded to a specification (e.g., dimensions) of the container and coated in polymer such that the foam core is encapsulated in polymer.

Process 700 continues with operation 704, which represents forming a channel connection (e.g., channel connection 124). Forming the channel connection may include forming a front overlap member (e.g., front overlap member 126) formed of polymer and fixed to a portion of the polymer covering the exterior surface of the foam core. In one example, the front overlap member may be sprayed on to a portion of the polymer covering the exterior surface of the foam core. In this example, the front overlap member may be formed of the same polymer as the portion of the polymer covering the exterior surface of the foam core and may be chemically bonded to the portion of the polymer covering the exterior surface of the foam core. Forming the channel connection may include forming a back overlap member (e.g., back overlap member 128) formed of polymer and fixed to a portion of the polymer covering interior surface of the foam core. In one example, the back overlap member may be sprayed on to a portion of the polymer covering the interior surface of the foam core. In this example, the back overlap member may be formed of the same polymer as the portion of the polymer covering the interior surface of the foam core and may be chemically bonded to the portion of the polymer covering the interior surface of the foam core. The front and back overlap members provide for overlapping a portion a second encapsulated foam core panel (e.g., an adjacent encapsulated foam core panel), and the channel connection couples the first and second encapsulated foam core panels to allow the insulated panel system to removably cover the exterior of the container.

Process 700 continues with operation 706, which represents forming a drip edge (e.g., drip edge 130) formed of polymer and fixed to another portion of the polymer covering the exterior surface of the foam core and extending beyond at least one of the end surfaces of the foam core. In one example, the drip edge may be sprayed on to another portion of the polymer covering the exterior surface of the foam core. In this example, the drip edge may be formed of the same polymer as the polymer covering the exterior surface of the foam core and may be chemically bonded to the polymer the exterior surface of the foam core.

Process 700 may be completed with operation 708, which represents forming an overlap member (e.g., overlap member 132) formed of polymer and fixed to another portion of the polymer covering the interior surface of the foam core opposite to the drip edge. In one example, the overlap member may be sprayed on to a portion of the polymer covering the interior surface of the foam core. In this example, the overlap member may be formed of the same polymer as the polymer covering the interior surface of the foam core and may be chemically bonded to the polymer covering the interior surface of the foam core. The drip edge and the overlap member may cooperatively couple the first encapsulated foam core panel to a third encapsulated foam core panel (e.g., a beneath encapsulated foam core panel) to allow the insulated panel system to removably cover the exterior of the container.

Conclusion

Although the disclosure uses language specific to structural features and/or methodological acts, the claims are not limited to the specific features or acts described. Rather, the specific features and acts are disclosed as illustrative forms of implementing the invention. For example, the various embodiments described herein may be rearranged, modified, and/or combined. As another example, one or more of the method acts may be performed in different orders, combined, and/or omitted entirely, depending on the insulated panel systems to be produced.

What is claimed is:

1. An insulated panel system for covering an exterior of a container comprising:
    a first encapsulated foam core panel comprising:
        an interior surface substantially coated by a first layer of sprayable polymer, an exterior surface substantially coated by the first layer of sprayable polymer, and end surfaces substantially coated by the first layer of sprayable polymer;
        a front overlap member formed of a second layer of sprayable polymer that is bonded to the first layer of sprayable polymer that coats the exterior surface of the first encapsulated foam core panel;
        a back overlap member formed of the second layer of sprayable polymer that is bonded to the first layer of sprayable polymer that coats the interior surface of the first encapsulated foam core panel;
    a second encapsulated foam core panel, coupleable to the first encapsulated foam core panel, comprising:
        an interior surface substantially coated by the first layer of sprayable polymer, an exterior surface substantially coated by the first layer of sprayable polymer, and end surfaces substantially coated by the first layer of sprayable polymer;
        a front overlap member formed of the second layer of sprayable polymer that is bonded to the first layer of sprayable polymer that coats the exterior surface of the second encapsulated foam core panel;
        a back overlap member formed of the second layer of sprayable polymer that is bonded to the first layer of sprayable polymer that coats the interior surface of the second encapsulated foam core panel;
        wherein the front overlap member of the first encapsulated foam core panel and the back overlap member of the first encapsulated foam core panel define a channel that receives a portion of the second encapsulated foam core panel to couple the first and second encapsulated foam core panels and allow the insulated panel system to removably cover the exterior of the container.

2. The insulated panel system of claim 1, wherein the first encapsulated foam core panel further includes a drip edge formed of polymer that is bonded to the first layer of sprayable polymer that coats the exterior surface of the first encapsulated foam core panel, the drip edge extending beyond at least one of the end surfaces of the first encapsulated foam core panel.

3. The insulated panel system of claim 2, wherein the first encapsulated foam core panel further includes an overlap member formed of the second layer of sprayable polymer that is bonded to the first layer of sprayable polymer that coats the interior surface of the first encapsulated foam core panel opposite to the drip edge, and the drip edge and the overlap member form another channel that receives a portion of a third encapsulated foam core panel.

4. The insulated panel system of claim 1, wherein the front and back overlap members of the first encapsulated foam core panel comprises a first pair of front and back overlap members, and
wherein the second encapsulated foam core panel comprises:
a second front overlap member formed of polymer that is bonded to the first layer of sprayable polymer that coats the exterior surface of the foam core of the second encapsulated foam core panel; and
a second back overlap member formed of polymer that is bonded to the first layer of sprayable polymer that coats the interior surface of the foam core of the second encapsulated foam core panel;
wherein the second front overlap member and the second back overlap member define a pair of front and back overlap members that receives a portion of a third encapsulated foam core panel to couple the second and third encapsulated foam core panels and allow the insulated panel system to removably cover the exterior of the container.

5. The insulated panel system of claim 1, further comprising at least one retaining member arrangeable around the first encapsulated foam core panel or the second encapsulated foam core panel to hold the first encapsulated foam core panel or the second encapsulated foam core panel on the exterior of the container.

6. The insulated panel system of claim 5, wherein the retaining member comprises a strap.

7. An encapsulated panel for covering an exterior of a container comprising:
an insulating layer having an interior surface that faces the container, an exterior surface that faces opposite the interior surface, and end surfaces;
a first layer of sprayable polymer that substantially covers the interior surface, the exterior surface, and the end surfaces;
a front overlap member formed of a second layer of sprayable polymer that is bonded to the first layer of sprayable polymer that coats the exterior surface; and
a back overlap member formed of the second layer of sprayable polymer that is bonded to the first layer of sprayable polymer that coats the interior surface;
wherein the front overlap member and the back overlap member define a channel that receives a portion of another encapsulated panel to couple the encapsulated panel and the another encapsulated panel and allow the encapsulated panel to removably cover the exterior of the container.

8. The encapsulated panel of claim 7, wherein the insulating layer comprises a foam core formed of a closed cell polyurethane.

9. The encapsulated panel of claim 7, wherein the first layer of sprayable polymer covering the interior surface, the exterior surface, and the end surfaces of the insulating layer comprises a sprayable polyurea.

10. The encapsulated panel of claim 7, wherein the encapsulated panel comprises a length of at least about 24 inches to at most about 96 inches, a width of at least about 12 inches to at most about 48 inches, and a thickness of at least about 1 inch to at most about 16 inches.

11. The encapsulated panel of claim 7, wherein the exterior of the container comprises a curvilinear shape having an arc, and the encapsulated panel comprises a curvilinear shape having an arc substantially equal to the arc of the exterior of the container.

12. The encapsulated panel of claim 7, further comprising a mechanical seal coupled to an end surface of the encapsulated panel to couple the encapsulated panel to the another encapsulated panel.

13. The encapsulated panel of claim 12, wherein the mechanical seal comprises a gasket.

14. The encapsulated panel of claim 12, wherein the mechanical seal comprises a weatherstripping.

15. The encapsulated panel of claim 7, wherein the encapsulated panel further includes a drip edge formed of the second layer of sprayable polymer that is bonded to the first layer of sprayable polymer that coats the exterior surface of the insulating layer, the drip edge extending beyond at least one of the end surfaces of the insulating layer.

16. The encapsulated panel of claim 15, wherein the encapsulated panel further includes an overlap member formed of the second layer of sprayable polymer that is bonded to the first layer of sprayable polymer that coats the interior surface of the insulating layer opposite to the drip edge, and the drip edge and the overlap member form another channel that receives a portion an underneath encapsulated panel.

17. A method of forming an insulated panel system to insulate an exterior of a container comprising:
forming a first insulating panel including:
forming an insulating layer having an interior surface to face the container, an exterior surface to face opposite the interior surface, and end surfaces;
coating the insulating layer in a first layer of sprayable polymer such that the first layer of sprayable polymer substantially covers at least the interior surface, the exterior surface, and the end surfaces;
forming a front overlap member from a second layer of sprayable polymer;
affixing the front overlap member to the first layer of sprayable polymer that coats the exterior surface of the insulating layer;
forming a back overlap member from the second layer of sprayable polymer; and
affixing the back overlap member to the first layer of sprayable polymer that coats the interior surface of the insulating layer;
wherein the front overlap member and the back overlap member define a channel that receives a portion a second insulating panel to couple the first and second insulating panels and allow the insulated panel system to removably cover and insulate the exterior of the container.

18. The method of claim 17 further comprising:
forming a drip edge from the second layer of sprayable polymer and affixing the drip edge to the first layer of sprayable polymer that coats the exterior surface of the insulating layer, the drip edge extending beyond at least one of the end surfaces of the insulating layer; and
forming an overlap member from the second layer of sprayable polymer and affixing the overlap member to the first layer of sprayable polymer that coats the interior surface of the insulating layer opposite to the drip edge;

wherein the drip edge and the overlap member form another channel that receives a portion of a third insulating panel.

* * * * *